United States Patent
Kubo et al.

[11] Patent Number: 5,959,368
[45] Date of Patent: Sep. 28, 1999

[54] POWER SUPPLY APPARATUS FOR SUPPLYING POWER FROM A PLURALITY OF BATTERIES TO A PLURALITY OF LOADS, AND ELECTRONIC APPLIANCE USING THE POWER SUPPLY APPARATUS

[75] Inventors: Takeshi Kubo; Kuniaki Saito; Hidekiyo Ozawa, all of Kawasaki, Japan

[73] Assignee: Fujitsu Limited, Kawasaki, Japan

[21] Appl. No.: 08/962,966

[22] Filed: Oct. 24, 1997

Related U.S. Application Data

[63] Continuation of application No. 08/501,921, Jul. 13, 1995, abandoned.

[30] Foreign Application Priority Data

Oct. 31, 1994 [JP] Japan .................................. 6-266460

[51] Int. Cl.⁶ ........................................................ H02J 1/10
[52] U.S. Cl. ................................ 307/18; 307/23; 307/25; 307/29; 307/38; 307/39; 307/48; 320/102; 320/121
[58] Field of Search ................................ 307/18, 23, 25, 307/29, 38, 81, 39; 320/102, 121, 427

[56] References Cited

U.S. PATENT DOCUMENTS

| | | | |
|---|---|---|---|
| 4,099,692 | 7/1978 | Kolkman | 246/34 |
| 4,101,787 | 7/1978 | Vall | 307/81 |
| 5,003,244 | 3/1991 | Davis | 320/17 |
| 5,115,182 | 5/1992 | Ehmke et al. | 320/14 |
| 5,483,165 | 1/1996 | Cameron et al. | 324/427 |

FOREIGN PATENT DOCUMENTS

| | | |
|---|---|---|
| 54-036131 | 3/1979 | Japan . |
| 60-201418 | 10/1985 | Japan . |

*Primary Examiner*—Albert W. Paladini
*Attorney, Agent, or Firm*—Nikaido, Marmelstein, Murray & Oram LLP

[57] ABSTRACT

In a power supply apparatus including a plurality of batteries and a plurality of power supply portions for connecting to loads, a plurality of switches connect these batteries to these power supply portions, respectively. The apparatus further includes a control mechanism which controls the opening and closing operations of the switches. When one of the switches is turned on in one of the power supply means, the control mechanism executes the control in such a manner that the other switches are turned off. The control mechanism further controls each of the switches on the basis of the remaining capacity of each battery and the load state of each power supply portion. Accordingly, the power supply operation can be flexibly carried out.

34 Claims, 7 Drawing Sheets

POWER SUPPLY APPARATUS FOR SUPPLYING POWER FROM A PLURALITY OF BATTERIES TO A PLURALITY OF LOADS, AND ELECTRONIC APPLIANCE USING THE POWER SUPPLY APPARATUS

This application is a continuation of application Ser. No. 08/501,921 filed Jul. 13, 1995, now abandoned.

BACKGROUND OF THE INVENTION

1. Field of the Invention

This invention relates to a power supply apparatus for supplying power to a plurality of loads by using a plurality of batteries as a power source, and an electronic appliance using the power supply apparatus.

Portable electronic appliances such as notebook-type personal computers generally use rechargeable batteries such as NiCad batteries, NiMH batteries, Li+ (lithium ion) batteries, etc., as power supplies, and charge the rechargeable batteries through charging circuits when AC adaptors are connected thereto.

A requirement for longer operating times of these portable electronic appliances, by increasing the battery capacities, has become important. This requirement can be satisfied, in principle, by connecting the batteries in series and then connecting the series circuits of the batteries in parallel, within the range of the withstand voltage of a power supply system. When a charging operation is conducted on the batteries connected in parallel, however, charging currents become different between the batteries in some cases due to the differences in impedance and differences in the charge state. Accordingly, there is the danger that a current exceeding a rated value is applied to some batteries.

When a discharging operation is made from the batteries connected in parallel to a load, discharge is made from one battery to another due to the differences in impedance or in charge state of the batteries, so that a current exceeding a rated value is passed in some cases.

For these reasons, it has been customary to employ a circuit construction in portable electronic appliances such that batteries connected in series are handled as a battery pack and the pack is individually charged and discharged. In portable electronic appliances employing such a circuit construction, a flexible construction must be used for the power supply, too, in order to cope with the diversie needs of the units constituting the appliances.

2. Description of the Related Art

A power supply apparatus using two batteries will be explained as an example of the prior art apparatuses. In the power supply apparatuses according to the prior art, loads inside the electronic appliance are dispersedly connected to a plurality of DC—DC convertors, and the input sides of all the DC—DC convertors are connected in common.

A first battery is connected to a first discharge switch, and this junction is connected to a second battery through a second discharge switch. A charging circuit is connected to the first battery through a first charge switch, and the charge circuit is connected to the second battery through a second charge switch.

The conventional portable electronic appliance uses either one of these two batteries as a power supply. When the first battery is used, the first discharge switch is turned ON so as to connect the first battery to all the DC—DC convertors and the second discharge switch is turned OFF so as to cut off the connection between the second battery and all the DC—DC convertors. When the second battery is used, on the other hand, the second discharge switch is turned ON so as to connect the second battery to all the DC—DC convertors and the first discharge switch is turned OFF so as to cut off the connection between the first battery and all the DC—DC convertors.

When the AC adaptor is connected, either one of the two batteries is the object of the charging operation. In other words, when the first battery is charged, the first charge switch is turned ON so as to connect the first battery to the charging circuit and the second charge switch is turned OFF so as to cut off the connection between the second battery and the charging circuit. When the second battery is charged, on the other hand, the second charge switch is turned ON so as to connect the second battery to the charging circuit and the first charge switch is turned OFF so as to cut off the connection between the first battery and the charging circuit.

In practice, this processing is executed by applying priority to the batteries. For example, when discharge of the first battery having higher priority is started and this battery becomes dead or empty, discharge is switched to the second battery while the charging operation of the first battery having higher priority is started. When the first battery is fully charged, the second battery is then charged.

As described above, the portable electronic appliance according to the prior art employs the construction wherein a plurality of DC—DC convertors of the appliance are handled as an integral unit, and the batteries collectively supply a voltage to them.

Accordingly, there arises the problem that when a unit requiring a large load current such as a wireless unit, etc., must be added to the appliance when the portable electronic appliance is upgraded, for example, the current exceeds the maximum supply current of the batteries and necessary power cannot be supplied.

Further, the conventional portable electronic appliance employs the construction wherein, when the batteries used as a power supply become dead or empty, they are merely switched to other batteries.

This results in the problem that when the load current of the DC—DC convertor becomes great for some reason or other, the apparatus cannot cope with such a situation. Further, the power supply apparatus does not at all consider how to extend the discharge life of the batteries.

SUMMARY OF THE INVENTION

In view of the technical background described above, the present invention aims at providing a novel battery-driven portable electronic appliance having a flexible power supply function capable of solving the problems with the prior art, described above.

To accomplish this object, in a power supply apparatus which includes a plurality of batteries and a plurality of power supply portions for connecting to loads, a plurality of batteries and a plurality of power supply portions are connected by a plurality of switches, respectively. The power supply apparatus of the invention includes also a control mechanism which executes control of the opening/closing operations of a plurality of switches in such a manner that when one of the switches is turned ON in one of the power supply portions, the other switches are turned OFF. Further, the control mechanism controls each switch on the basis of the remaining capacity of each battery and a load state of the power supply portion. In this way, the power supply operation can be made flexible.

The power supply apparatus according to the present invention can supply power from an external DC power supply to the power supply portions by using an AC adaptor, or the like. At this time, a charging circuit for charging each battery from the external DC power supply can be used. When each battery is charged by the charging circuit, the control mechanism executes control in such a manner that the charging operation can be sequentially done, one by one, on the batteries.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
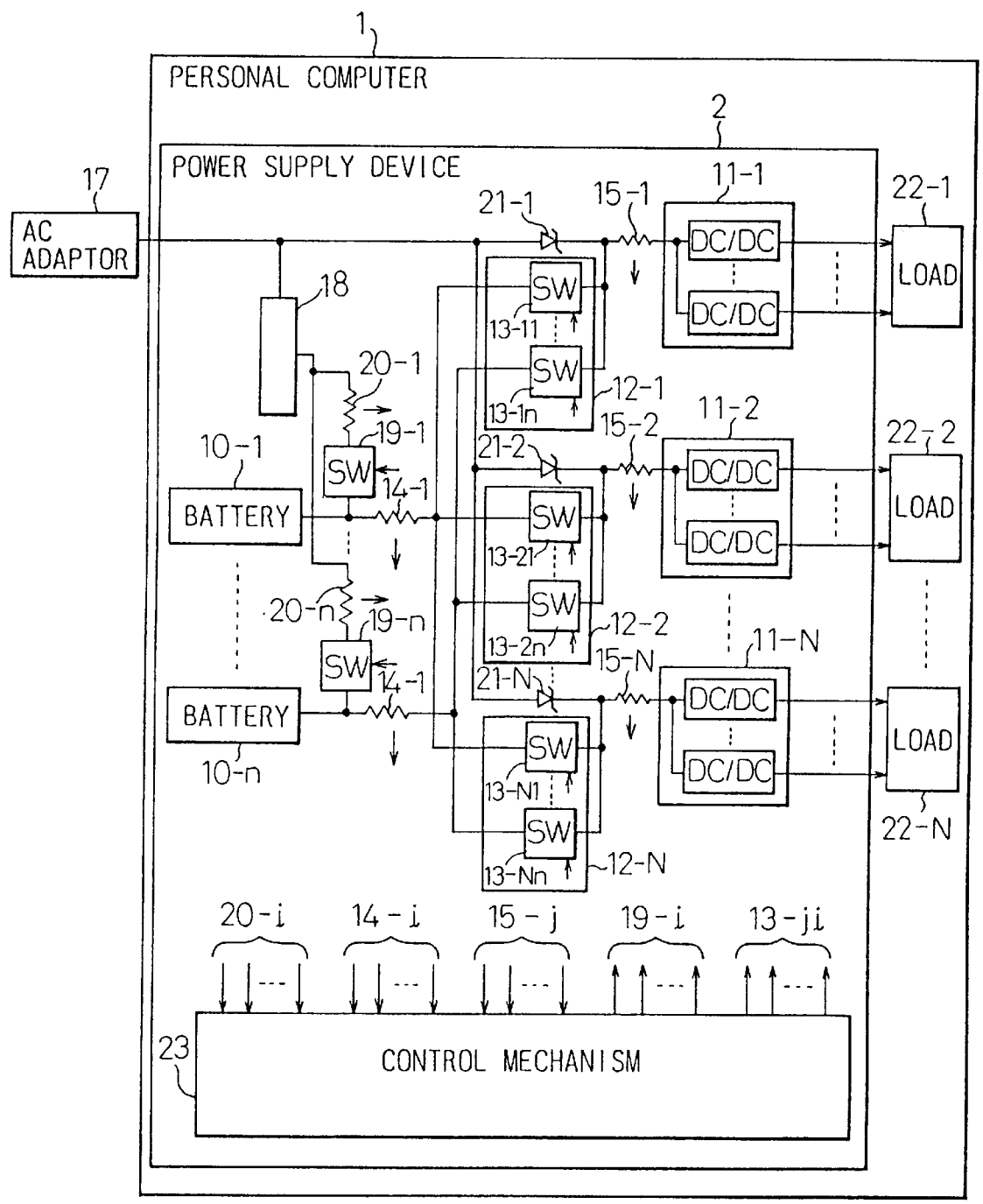
FIG. 1 is a circuit diagram of an embodiment of the present invention.

Hereinafter, the present invention will be explained in detail with reference to embodiments thereof. FIG. 1 typically illustrates a battery-driven type electronic appliance equipped with a power supply apparatus. In the drawing, reference numeral 1 denotes a personal computer, which includes a power supply apparatus 2 and a plurality of loads 22-j (where j=1 to N). In the power supply apparatus 2, reference numeral 10-i (where i=1 to n) denotes a plurality of batteries. Reference numeral 11-j (where j=1 to n) denotes a plurality of power supply portions for supplying power to the loads 22-j by converting the feed voltage of the batteries 10-i. Here, each of the power supply portions 11-j comprises one or a plurality of DC/DC convertors as shown in FIG. 1.

Reference numeral 12-j (where j=1 to N) denotes a group of switches, which are so disposed as to correspond to the power supply portions 11-j, respectively, comprise switches 13-j (where j=1 to N) corresponding to the batteries 10-i, and control connection between the batteries 10-i and the power supply portions 11-j. The switch 13-ji (where j=1 to N, i=1 to n) comprises an EFT, or the like.

Reference numeral 14-i (where i=1 to n) denotes a resistor for detecting a discharging current. This resistor is so disposed as to correspond to the battery 10-i, and generates a voltage corresponding to the discharging current of the battery 10-i.

Reference numeral 15-j (where j=1 to N) denotes a resistor for detecting a load current. Each resistor 15-j is so disposed as to correspond to the power supply portion 11-j and generates a voltage in accordance with a load current of the power supply portion 11-j.

Reference numeral 17 denotes an AC adaptor and reference numeral 18 denotes a charge circuit. The charge circuit comprises a constant current circuit and supplies a charging current to the battery 10-i when the AC adaptor 17 is connected. Reference numeral 19-i denotes a charging switch means comprising an EFT, or the like. This means is disposed in such a manner as to correspond to the battery 10-i, and controls whether or not the charging current outputted by the charge circuit 18 should be supplied to the battery 10-i. Reference numeral 20-i (where i=1 to n) denotes a resistor for detecting the charging current. This resistor is disposed in such a manner as to correspond to the battery 10-i and generates a voltage in accordance with the charging current of the battery 10-i.

Reference numeral 21-j (where j=1 to N) denotes a diode. The diode 21-j is so disposed as to correspond to the switch group 12-j, and prevents the outflow of power of the battery 10-i to the outside when the AC adaptor 17 is not operative. Reference numeral 22-j (where j=1 to N) denotes a load, which is so disposed as to correspond to the power supply portion 11-j and executes a predetermined data process upon receiving power from the power supply portion 11-j. Reference numeral 23 denotes a control mechanism. The control mechanism 23 comprises a CPU, detects the remaining capacity of the battery 10-i, dynamically controls the open/close mode of the switch 13-ji of the switch group 12-j, and further dynamically controls the open/close mode of the switch means 19-i for charging.

As described above, the present invention is characterized by employing a construction such that the batteries 10-i for supplying the voltage to the power supply portions ll-j can be freely controlled by controlling the open/close mode of the switches 13-ji.

FIGS. 2 to 5 show the process flows executed by the control mechanism 23. Next, the present invention will be explained in detail with reference to these process flows.

Figure 2:
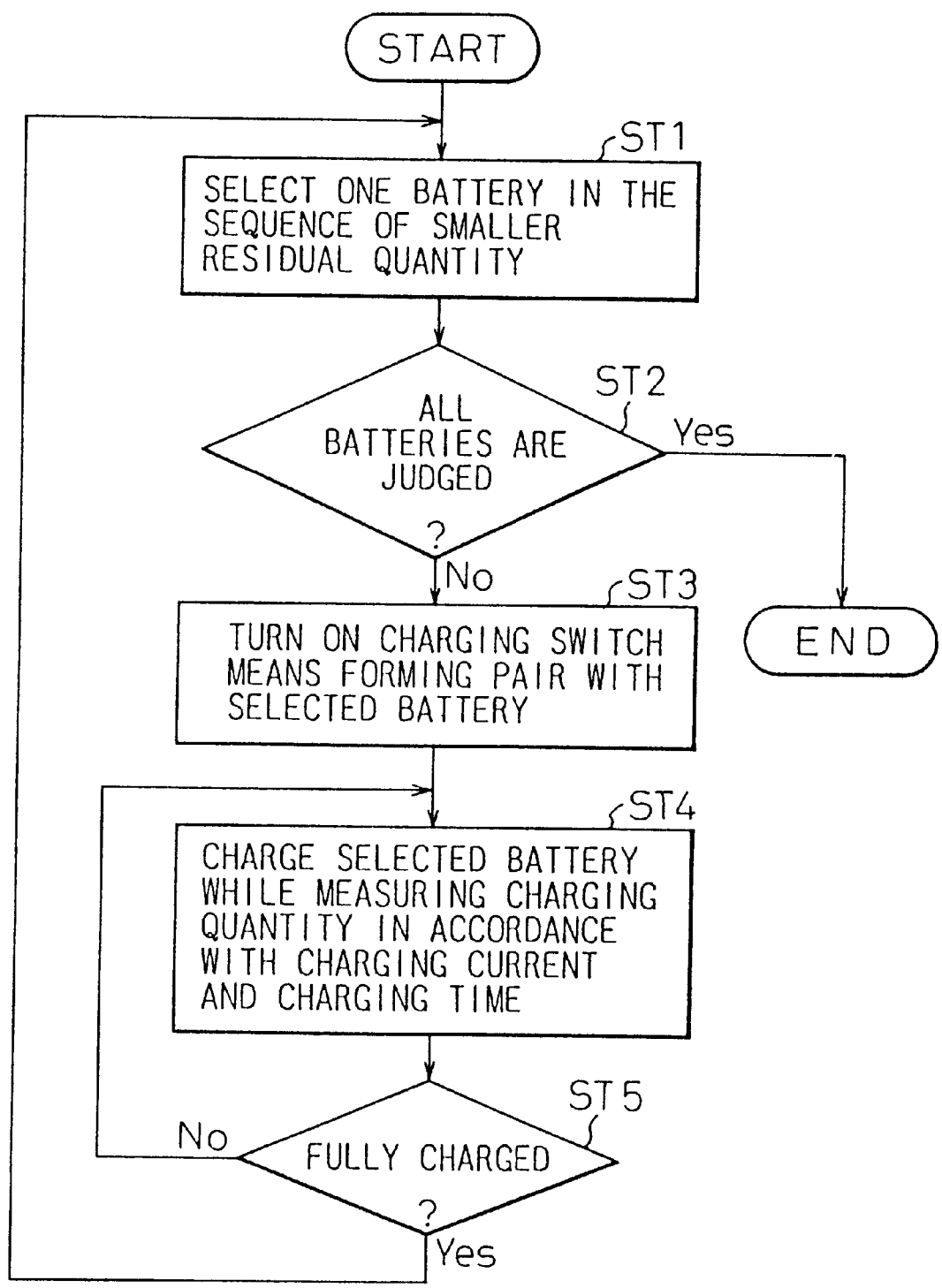
FIG. 2 is a flowchart useful for explaining a charge processing executed by a control mechanism shown in FIG. 1.

The control mechanism 23 begins the charge process for the battery 10-i when the AC adaptor 17 is fitted. As shown in the flowchart of FIG. 2, first, one battery 10-i is selected in the order of less remaining capacity, at step ST1. At the next step ST2, whether or not the process is complete for all the batteries 10-i is judged. When the process is judged as being finished, the charge process is finished, and when the process is not judged as being finished, the flow proceeds to the step ST3, where the switch means 19-i for charging, which forms a pair with the selected battery 10-i, is turned ON so as to start the charge process of the selected battery 10-i.

At the subsequent step ST4, the charging current is measured from the voltage generated by the charging current detection resistor 20-i forming a pair with the selected battery 10-i, and an increment in the charging quantity is measured by accumulating the charging current so measured for the charging time (by calculating "charging current× charging voltage" when the charging quantity is defined as power). The charging current of the selected battery 10-i is measured by adding the increment to the charging quantity before the start of the charging operation. When the arrival at full charge is judged at the subsequent step ST5, the flow returns to the step ST1 so as to start charging the next battery 10-i.

On the other hand, when the AC adaptor 17 is not fitted and the voltage is supplied from the battery 10-i to the power supply portion 11-j, the control mechanism 23 decides which battery 10-i executes discharge in accordance with the process flows shown in the later-appearing FIGS. 4 and 5. At this time, the decreasing charge quantity of the battery 10-i is measured in accordance with the process flow shown in FIG. 3.

Figure 3:
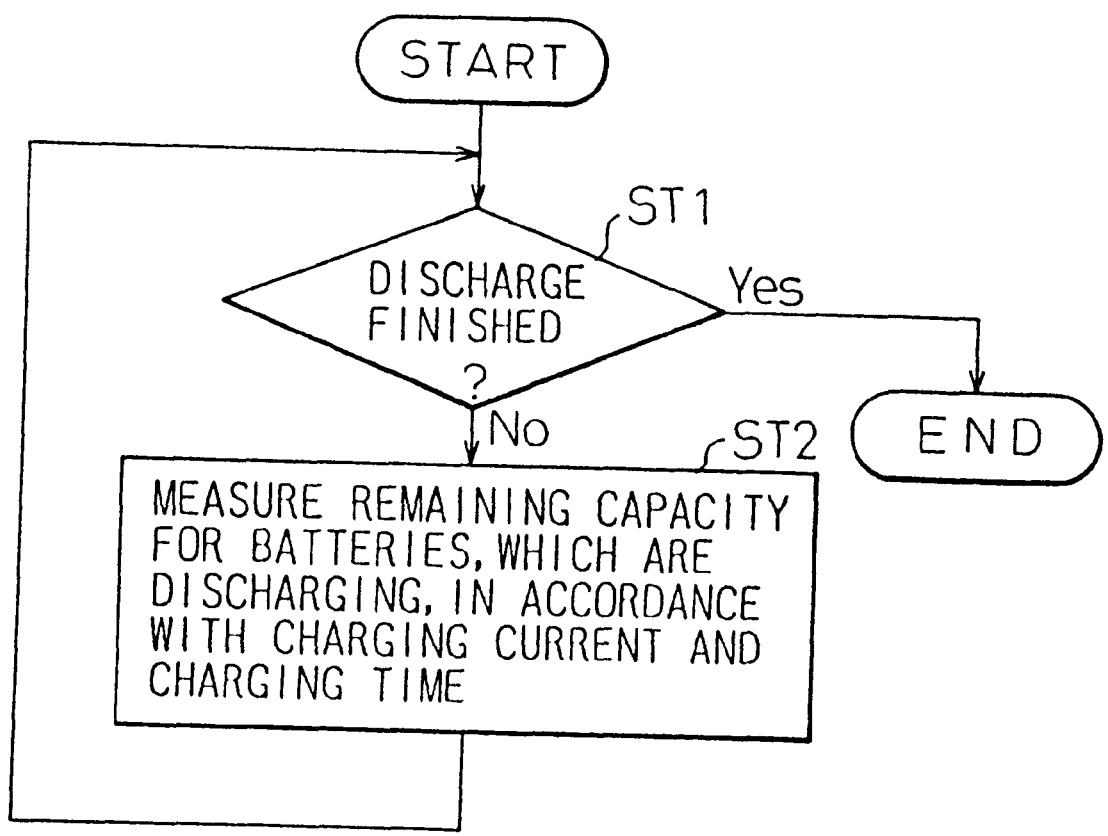
FIG. 3 is a flowchart useful for explaining a process for calculating the remaining capacity of a battery, executed by the control mechanism shown in FIG. 1.

In other words, as shown in the process flow of FIG. 3, the discharging current is measured for the battery 19-i which is being discharged, from the voltage generated by the associated discharging current detection resistor 14-i, and the discharging current so measured is added up for the discharging time so as to measure the decrement of the charging quantity (by calculating the "discharging current× discharging voltage" when the charging quantity is defined as power), and then subtracting the result from the charging quantity at the start of discharge so as to obtain the remaining capacity of the battery 10-i being discharged.

By executing the processing flows shown in FIGS. 2 and 3 in this way, the control mechanism 23 detects how much charging quantity remains in the battery 10-i.

Next, the discharge control process for the battery 10-i executed by the control mechanism 23 will be explained using the process flows shown in FIGS. 4 and 5. It will be hereby assumed that the processing flow shown in FIG. 4 uses a plurality of batteries 10-i but that the processing flow shown in FIG. 5 uses only one battery 10-i as much as possible.

First, the processing flow shown in FIG. 4 will be explained.

Figure 4:
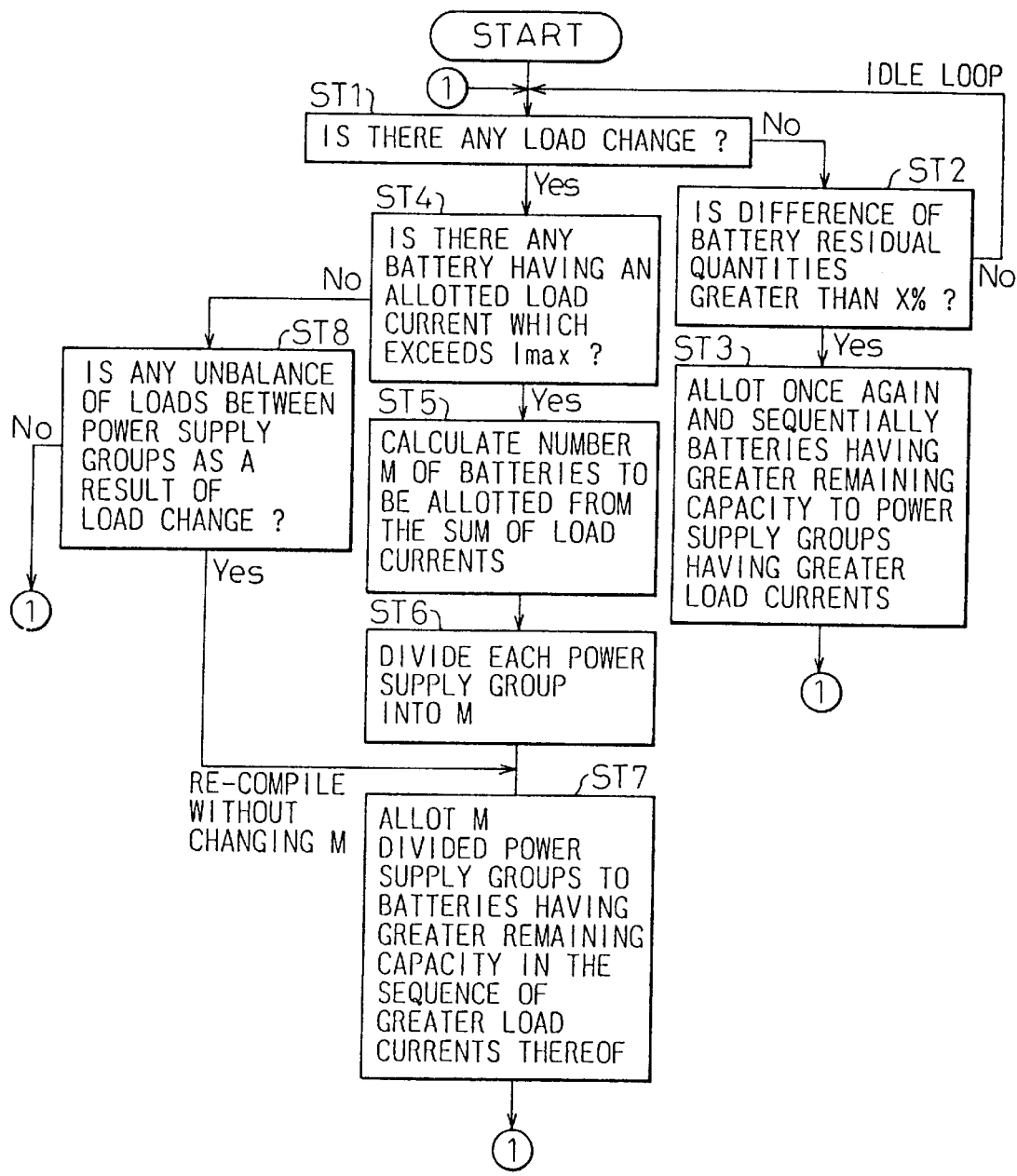
FIG. 4 is a flowchart useful for explaining a first discharge control process executed by the control mechanism shown in FIG. 1.

The first case is where the control mechanism 23 executes the discharge control process for the batteries 10-i in accordance with the process flow shown in FIG. 4 when the AC adaptor 17 is not fitted. First, whether or not any change in the load occurs is judged at the step ST1. In other words, whether or not any change in the load occurs is judged such as when a circuit having large power consumption such as a display mechanism, a wireless mechanism, or the like, is driven as the load. More concretely, this judgement process is executed by monitoring the voltage generated by the load current detection resistor 15-j or monitoring the addition of a new load 22-j.

When a load change is not detected at this step ST1, the flow proceeds to the step ST2, and whether or not the difference between the maximum and minimum batteries 10-i in use exceeds a rated value X% by looking up the remaining capacity of the batteries 10-i in use is judged. When such a difference does not exist, the flow returns to the step ST1. When such a difference does exist, on the other hand, the flow proceeds to the step ST3, where the open/close mode of the switch means 13-ji of the switch group 12-j is controlled so that the battery 10-i having a large remaining capacity is connected to a power supply portion 11-j having a large load while the battery 10-i having a small remaining capacity is connected to a power supply 11-j having a small load. Then, the flow returns to the step ST1. In other words, this control is made so that the remaining capacity of the batteries 10-i in use become uniform. Because the discharge life of the batteries 10-i becomes longer with a smaller discharging current, the discharge life of the batteries 10-i can be extended by this control processing.

By the way, in the processing of these steps ST2 and ST3, the batteries 10-i in use are the object of the process, but it is also possible to execute the control for all the batteries 10-i inclusive of the unused batteries and to exchange the batteries 10-i in use, which have a small remaining capacity, by the unused batteries 10-i having a large remaining capacity.

On the other hand, when a load change is judged as existing at the step ST1, the flow proceeds to the step ST4, and whether or not a battery 10-i, the allotted load current of which exceeds an allowable value Imax, exists is judged in accordance with the load change. In other words, whether or not the battery 10-i, whose discharging current exceeds the allowable value Imax, exists is judged. When such a battery 10-i is judged as existing by this judgement process, the flow proceeds to the step ST5, and the number of the batteries 10-i to be used is calculated by using the sum of the load currents. This calculation process is carried out, for example, by dividing the sum of the load currents by the allowable value Imax. In other words, the number of the batteries 10-i capable of supplying the sum of the load currents is calculated under the condition that the discharging current is within the range of the allowable value Imax.

When the number M of the batteries 10-i to be used is calculated at the step ST5, the power supply portions 11-j are divided into M groups in such a manner that the load currents become uniform, at the step ST6. At the subsequent step ST7, the open/close mode of the switch means 13-ji of the switch group 12-j is controlled so that the batteries 10-i having large remaining capacity can be connected to the power supply portions 11-j having a large load and the batteries 10-i having a small residual quantity can be connected to the power supply portions 11-j having a small load among the M batteries 10-i to be used and the power supply portions 11-j which are grouped into M groups. The flow then returns to the step ST1.

By the way, when the load current increases, in the steps ST5 to ST7 described above, the allotment relation between the batteries 10-i and the power supply portions 11-j is reestablished so that the remaining capacities of the batteries 10-i used become uniform in accordance with the condition of use so as to employ the unused batteries. However, it is also possible to simply connect the unused batteries 10-i to the power supply portions 11-j having an increasing load.

On the other hand, when the batteries 10-i whose discharging current exceeds the allowable value Imax are judged as not existing even when the load change exists, at the step ST4, whether or not the loads become unbalanced between the group of the power supply portions 11-j as a result of the load change is judged at the step ST8. When the balance is kept, the flow returns, as such, to the step ST1. On the other hand, when the unbalance is judged as existing, the flow proceeds to the step ST7 without changing the number M of groups of the power supply portions 11-j, the open/close mode of the switch means 13-ji of the switch group 12-j is controlled so that among the M batteries 10-i and M groups of the power supply portions 11-j, the batteries 10-i having a large remaining capacity can be connected to the power supply portions 11-j having a large load and the batteries 10-i having a small remaining capacity can be connected to the power supply portions 11-j having a small load. The flow then returns to the step ST1.

By executing the processing flow shown in FIG. 4, the control mechanism 23 uses the unused batteries 10-i (preferably having a greater remaining capacity) when the load of the power supply portion 11-j becomes large, and executes the control so that the remaining capacities of the batteries 10-i in use become uniform in order to extend the discharge life of the batteries 10-i.

Incidentally, the processing flow shown in FIG. 4 assumes only the case where the load becomes larger. However, it is also possible to prepare the unused batteries 10-i so as to stop using the batteries 10-i in use (preferably having a small remaining capacity) when the load becomes small.

Next, the processing flow of FIG. 5 will be explained.

According to this processing flow, the control mechanism 23 uses one battery 10-i as much as possible.

Figure 5:
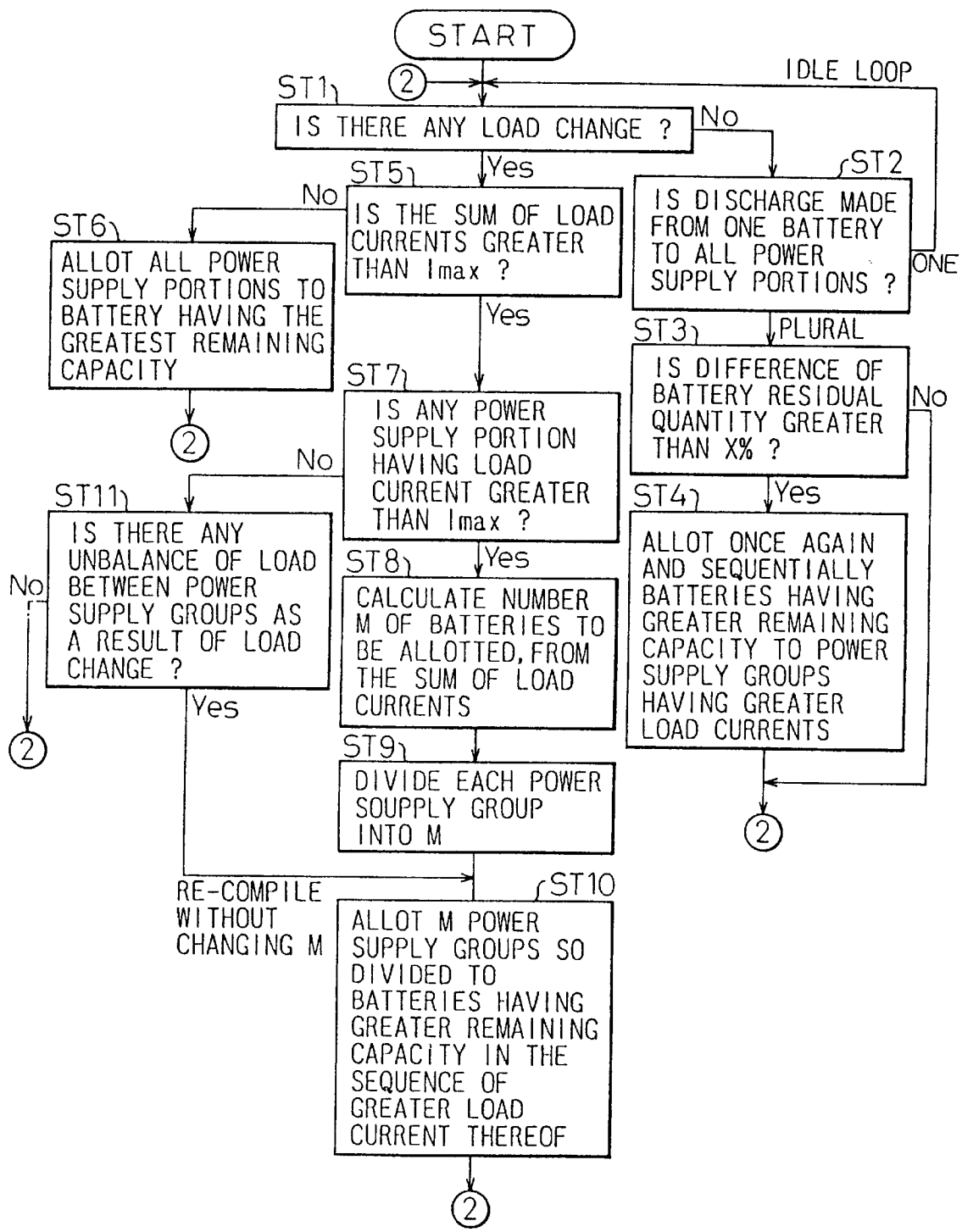
FIG. 5 is a flowchart useful for explaining a second discharge control process executed by the control mechanism of FIG. 1.

It will be hereby assumed that the control mechanism 23 executes the discharge control processing of the batteries 10-i in accordance with the processing flow of FIG. 5 when the AC adaptor 17 is not fitted. First, whether or not any load change exists is judged at the step ST1. When the load change is not judged as existing, the flow proceeds to the step ST2, and whether or not the battery 10-i in use is the only one is judged. When the result proves yes, the flow returns, as such, to the step ST1. On the other hand, when the batteries 10-i in use are a plurality of batteries, the flow proceeds to the step ST3, which executes the same processing as that of the step ST3 of the processing flow of FIG. 4. The flow then proceeds to the step ST4 which executes the same process as that of the step ST3 of the processing flow of FIG. 4.

On the other hand, when a load change is judged as existing at the step ST1, the flow proceeds to the step ST5. Next, whether or not the sum of the load currents exceeds the allowable value Imax of the discharging current is judged, and when the result proves no, the flow proceeds to the step ST6. After the batteries 10-i in use are exchanged with the unused batteries 10-i having the greatest residual quantity, the flow returns to the step ST1. When the sum of the load currents is judged as exceeding the allowable value Imax, on the other hand, the flow proceeds to the step ST7 which executes the same processing as that of the step ST4 of the processing flow of FIG. 4, and the flow then proceeds to the steps ST8 to ST11 which execute the same processing as those of the steps ST5 to ST8 of the processing flow of FIG. 4.

By executing the processing flow shown in FIG. 5, the control mechanism 23 uses one battery 10-i as much as possible. When the load becomes so great that only one battery 10-i cannot satisfy the power requirement, the control mechanism 23 starts using the unused battery 10-i and effects control in order to extend the discharge life of the battery 10-i to make uniform the remaining capacity of the batteries 10-i in use.

When two batteries 10-i (i=1, 2) are provided, for example, it has been a customary practice to employ a fixed construction wherein a voltage is supplied to all the power supply portions 11-j by using the battery 10-1 having higher priority and to supply the voltage to all the power supply portions 10-j by the other battery 10-2 when the battery 10-1 is fully used. This construction results in the problem that it cannot cope with a power supply portion 111-j having a large load when such a power supply portion is added.

In contrast, the processing flow shown in FIG. 5 of the present invention can eliminate such a problem. In other words, when a power supply portion 11-j is added while the voltage is supplied from the battery 10-1 to all the power supply portions 11-j, the present invention can supply the voltage to this new power supply portion 11-j from the other battery 10-2. Moreover, because the allotment relation between the batteries 10-i and the power supply portions 11-j is changed so that the remaining capacity of the two batteries 10-i become uniform, the discharge life of these two batteries can be extended.

Figure 6:
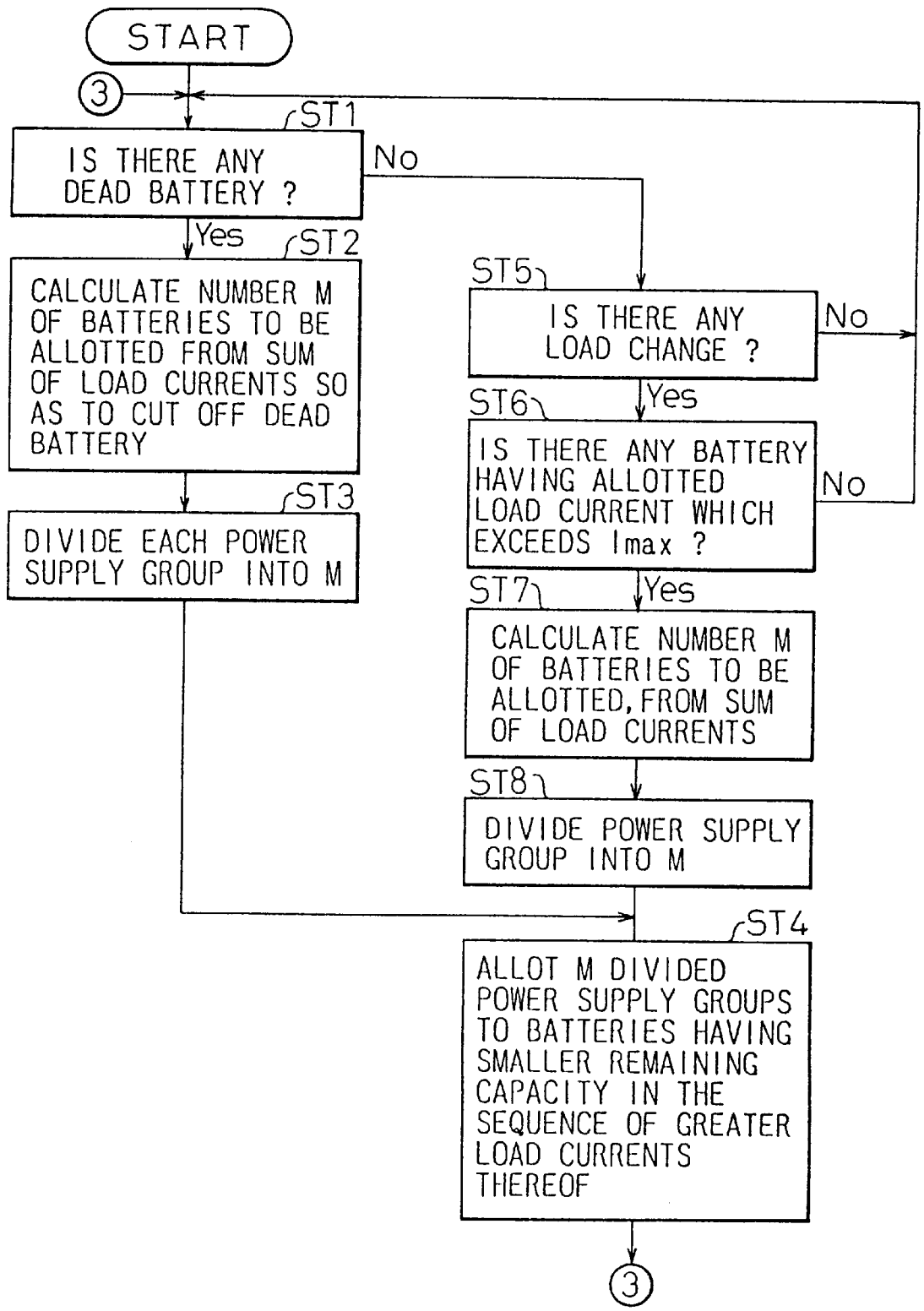
FIG. 6 is a flowchart useful for explaining a third discharge control process executed by the control mechanism shown in FIG. 1.
Figure 7:
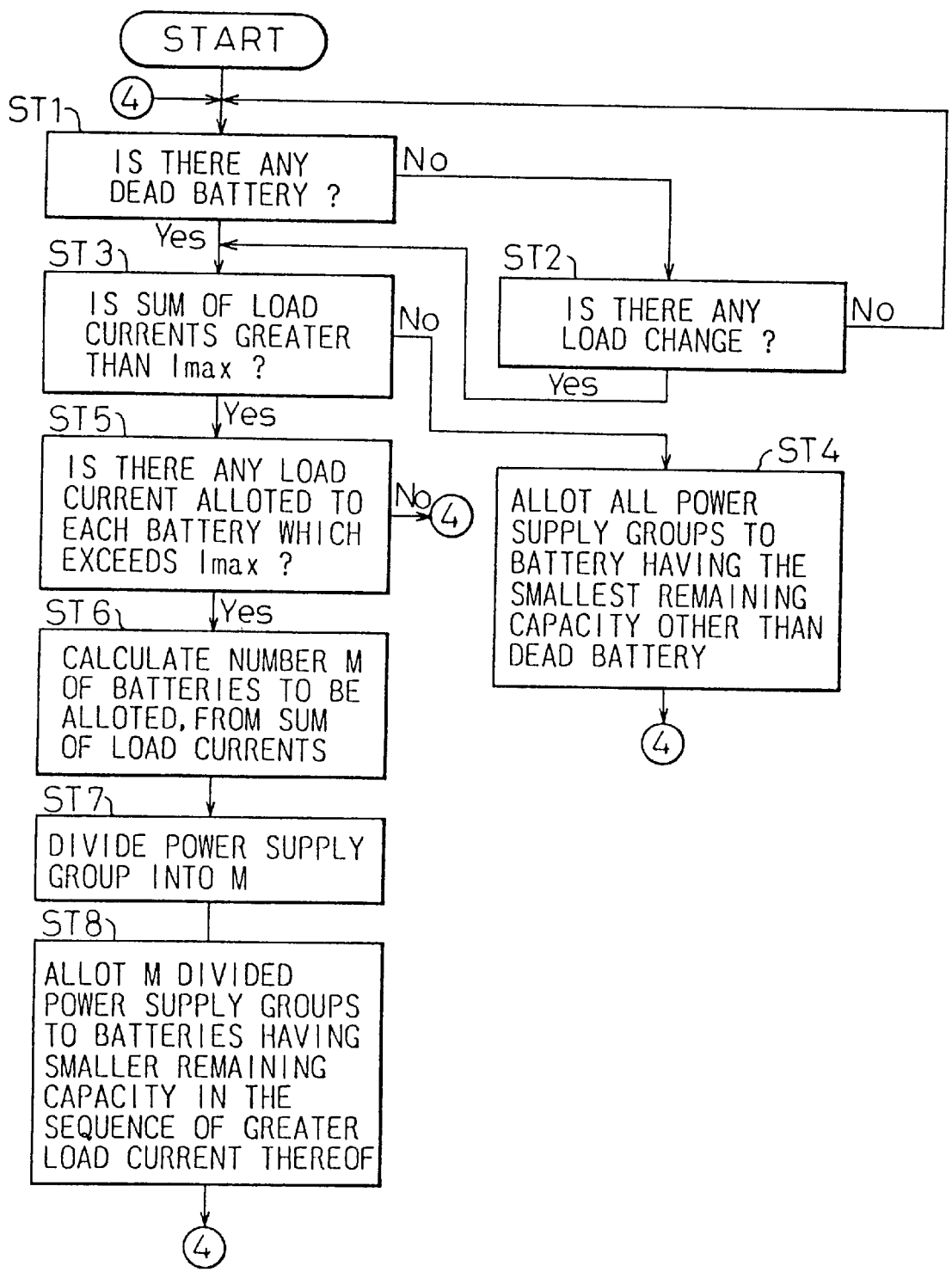
FIG. 7 is a flowchart useful for explaining a fourth discharge control process executed by the control mechanism shown in FIG. 1.

Next, a modified example of the discharge control processing of the batteries 10-i executed by the control mechanism 23 will be explained with reference to the processing flows shown in FIGS. 6 and 7. When the battery used is a battery having a memory effect such as a NiCd battery, the charging operation must be carried out on the battery which becomes empty. In other words, a power supply portion having a large load current must be allotted to a battery having a small residual quantity, or discharge must be controlled so that a certain battery becomes empty. By the way, the processing flow shown in FIG. 6 is based on the premise that a plurality of batteries 10-i are used, while the processing flow shown in FIG. 7 is based on the premise that one battery 10-i is used as much as possible.

The processing shown in FIG. 6 will be explained. In FIG. 6, whether or not a dead battery (empty battery) exists among the batteries which are discharging is judged at the step ST1. If any dead battery exists, the flow proceeds to the step ST2, and the number M of the batteries to be allotted is calculated from the sum of the load currents under the condition that the dead battery is cut off. At the next step ST3, the power supply portions 11-j are divided into the M groups used. At the subsequent step ST4, the power supply portions 11-j divided into M groups are sequentially allotted to the batteries having smaller remaining capacity in the sequence of greater load currents, and the flow returns to the step ST1. Here, the dead battery is cut off. When a battery is charged, and the charging process is executed on this empty battery. Therefor, the memory effect at the recharging can be prevented.

When a dead battery does not exist at the step ST1, the flow proceeds to the step ST5, and whether or not any load change exists is judged. When a load change does not exist at this step ST5, the flow returns to the step ST1. On the other hand, when the load change does exist, the flow proceeds to the step ST6, and whether or not the load current allotted to each battery exceeds the allowable value Imax is judged. When the result is no, the flow returns to the step ST1. When the result is yes, the flow proceeds to the step ST7, and the number M of the batteries to be allotted is calculated on the basis of the sum of the load currents. At the next step ST8, the power supply portions 11-j are divided into the M groups used, and the flow proceeds to the step ST4 that has already been explained.

The processing flow shown in FIG. 7 will be explained. In FIG. 7, whether or not a dead battery exists among the batteries which are discharging is judged at the step ST1. If the result is no, the flow proceeds to the step ST2, and whether or not any load change exists is judged. When the result is no at this step ST2, the flow returns to the step ST1. When the load change is judged as existing at the step ST2, or when a dead battery is judged as existing at the step ST1, the flow proceeds to the step ST3, and whether or not the sum of the load currents exceeds the current allowable value Imax of one battery is judged. If it is below the Imax, all the power supply portions 11-j are allotted to the battery having the smallest residual quantity other than the dead battery, at the step ST4, and the flow then returns to the step ST1.

When the sum of the load currents is greater than Imax at the step ST3, the flow proceeds to the step ST5, and whether or not any of the load current allotted to each battery exceeds the allowable value Imax is judged. If the result is no, the flow returns to the step ST1. If any of the load currents exceeds Imax, the number M of the batteries to be allotted is calculated on the basis of the sum of the load currents at the step ST6. At the next step ST7, the power supply portions 11-j are divided into M groups, and the flow then proceeds to the step ST8. At this step ST8, the power supply portions 11-j divided into M groups are sequentially allotted in the sequence of their load currents to the batteries having smaller residual quantities, and the flow then returns to the step ST1.

Though the embodiments shown in the drawings have thus been described, the present invention is not particularly limited thereto. For instance, the discharge control processing of the batteries 10-i described in the embodiments is only one embodiment, and the gist of the present invention essentially resides in the construction wherein the batteries 10-i for supplying the voltages to the power supply portions ll-j can be freely controlled so as to accomplish a flexible power supply operation.

Because the present invention can accomplish flexible power supply in a battery-driven electronic appliance as described above, the power can be supplied in the optimum form in accordance with the condition of the battery-driven electronic appliance.

Accordingly, the present invention can solve the problems in the prior art that the existing power supply cannot cope with a new requirement that a unit requiring a large load current such as a wireless unit must be incorporated during an upgrade of the battery-driven electronic appliance and that the power supply device cannot cope with an increasing load current on the DC/DC converter which occurs for some reason or other.

Furthermore, the present invention can greatly extend the discharge life of the battery used for the battery-driven electronic appliance.

We claim:

1. A power supply means comprising:

a plurality of batteries;

a plurality of power supply means for connecting to loads;

a plurality of switch means for connecting each of said batteries to each of said power supply means;

discharging current measurement means for measuring discharging currents of a plurality of said batteries; and control means for controlling opening and closing operations of the plurality of said switch means in accordance with a remaining capacity of each of said batteries and with a load state by measuring a remaining capacity of each of said batteries, and by measuring a load current for each of said power supply means.

2. A power supply apparatus comprising:

a plurality of secondary batteries;

a plurality of power supply means for connecting to loads;

a plurality of switch means for connecting each of said batteries to each of said power supply means;

external power supply input means for connecting an external DC power supply to each of said power supply means;

a charging circuit connected between said external power supply input means and each of said batteries;

discharging current measurement means for measuring a discharging current of each of said batteries;

charging current measurement means for measuring a charging current for each of said batteries;

load current measurement means for measuring a load current for each of said power supply means as a load state of said power supply means; and control means for calculating the remaining capacity of each of said batteries from the discharging current measured by said discharging current measurement means and the charging current measured by said charging current measurement means, and for controlling opening and closing operations of each of said switch means in accordance with each of said battery remaining capacity and each of said load states.

3. A power supply apparatus according to claim 2, wherein said power supply means includes a DC—DC convertor for converting an input voltage to a constant voltage.

4. A power supply apparatus according to claim 2, which further comprises a plurality of backflow prevention diodes connected between said external power supply input means and each of said power supply means.

5. A power supply apparatus according to claim 2, which further comprises a plurality of switch means connected between each of said batteries and said charging circuit.

6. A power supply apparatus according to claim 5, wherein said control means controls said switch means in such a manner as to sequentially charge, one by one, said batteries when each of said batteries is charged by said charging circuit.

7. A power supply apparatus according to claim 2, wherein said control means controls said switch means in such a manner that one of said power supply means is connected to one of said batteries.

8. A power supply apparatus according to claim 2, wherein said control means controls said switch means in such a manner that a plurality of said power supply means are connected to one of said batteries.

9. A power supply apparatus according to claim 2, wherein said control means controls said switch means in such a manner that said batteries having greater remaining capacity are connected to said power supply means having greater loads.

10. A power supply apparatus according to claim 2, wherein said control means controls said switch means in such a manner that said batteries having smaller remaining capacity are connected to said power supply means having greater loads.

11. An electronic appliance equipped with a power supply apparatus, said power supply apparatus comprising:

a plurality of batteries;

a plurality of power supply means for connecting to loads;

a plurality of switch means for connecting each of said batteries to each of said power supply means;

discharging current measurement means for measuring discharging currents of a plurality of said batteries; and control means for controlling opening and closing operations of the plurality of switch means in accordance with a residual quantity of each of said batteries and with a load state by measuring a residual quantity of each of said batteries, and measuring a load current for each of said power supply means.

12. An electronic appliance equipped with a power supply apparatus, said power supply apparatus comprising:

a plurality of secondary batteries;

a plurality of power supply means for connecting to loads;

a plurality of switch means for connecting each of said batteries to each of said power supply means;

external power supply input means for connecting an external DC power supply to each of said power supply portions;

a charging circuit connected between said external power supply input means and each of said batteries;

discharging current measurement means for measuring a discharging current of each of said batteries;

charging current measurement means for measuring a charging current for each of said batteries;

load current measurement means for measuring a load current for each of said power supply means as a load state of said power supply means; and control means for calculating a remaining capacity of each of said batteries from the discharging current measured by said discharging current measurement means and the charging current measured by said charging current measurement means, and for controlling opening and closing operations of each of said switch means in accordance with each of said battery remaining capacity and each of said load states.

13. An electronic appliance according to claim 12, wherein said power supply means includes a DC—DC convertor for converting an input voltage to a constant voltage.

14. An electronic appliance according to claim 12, which further comprises a plurality of backflow prevention diodes connected between said external power supply input means and each of said power supply means.

15. An electronic appliance according to claim 12, which further comprises a plurality of switch means connected between each of said batteries and said charging circuit.

16. An electronic appliance according to claim 15, wherein said control means controls said switch means in such a manner as to sequentially charge said batteries one by one when each of said batteries is charged by said charging circuit.

17. An electronic appliance according to claim 12, wherein said control means controls said switch means in such a manner that one of said power supply means is connected to one of said batteries.

18. An electronic appliance according to claim 12, wherein said control means controls said switch means in such a manner that a plurality of said power supply means are connected to one of said batteries.

19. An electronic appliance according to claim 12, wherein said control means controls said switch means in such a manner that said batteries having greater remaining capacity are connected to said power supply means having greater loads.

20. An electronic appliance according to claim 12, wherein said control means controls said switch means in such a manner that said batteries having smaller remaining capacity are connected to said power supply means having greater loads.

21. A power supply apparatus, comprising:
a plurality of batteries;
a plurality of power supply means for connecting to loads;
a plurality of switch circuits for connecting each of the batteries to each of the power supply circuits;
discharging current measurement means for measuring a discharging current of each of said batteries; and
a controller for controlling opening and closing operations of each of said switch circuits in accordance with a remaining capacity of each of said batteries measured by said discharging current measurement means.

22. An electric appliance equipped with a power supply apparatus, said power supply apparatus further comprising:
a plurality of batteries;
a plurality of power supply circuits for connecting to a plurality of loads;
a plurality of switch circuits for connecting each of the batteries to each of the power supply circuits;
discharging current measurement means for measuring a discharging current of each of said batteries; and
a controller for controlling opening and closing operations of each of said switch circuits in accordance with a remaining capacity of each of said batteries measured by said discharging current measurement means.

23. A power supply apparatus, comprising:
a plurality of battery connection means;
a plurality of power supply means for connecting to loads;
a plurality of switch means for connecting each of said plurality of battery connection means to each of said power supply means;
discharging current measurement means for measuring discharging currents through the battery connection means; and
control means for controlling opening and closing operations of the plurality of said switch means in accordance with a remaining capacity of batteries connected to each of said battery connection means and with a load state by measuring the remaining capacity of the batteries, and by measuring a load current for each of said power supply means.

24. A power supply apparatus, comprising:
a plurality of connection means for connecting to a corresponding plurality of batteries;
a plurality of power supply means for connecting to loads;
a plurality of switch means for connecting each of said battery connection means to each of said power supply means;
external power supply input means for connecting an external DC power supply to each of said plurality of power supply means;
a charging circuit connected between said external power supply input means and each of said plurality of battery connection means;
discharging current measuring means for measuring a discharging current through each of said battery connection means;
charging current measuring means for measuring a charging current through each of said battery connection means;
load current measuring means for measuring a load current for each of said power supply means as a load state of said power supply means; and
control means for calculating a remaining capacity of the batteries connected to each of the plurality of battery connection means from the discharging current measured by said discharging current measurement means and the charging current measured by said charging current measuring means, and for controlling opening and closing operations of said switch means in accordance with the remaining capacity of the batteries in each of said load states.

25. An electronic appliance equipped with a power supply apparatus, said power supply apparatus comprising:
a plurality of battery connection means;
a plurality of power supply means for connecting to loads;
a plurality of switch means for connecting each of said plurality of battery connection means to each of said power supply means;
discharging current measurement means for measuring discharging currents through said plurality of battery connection means; and
control means for controlling opening and closing operations of the plurality of switch means in accordance with a residual quantity of batteries connected to said battery connection means and with a load state by measuring a residual quantity of each of the batteries.

26. An electronic appliance equipped with a power supply apparatus, said power supply apparatus comprising:

a plurality of battery connection means;

a plurality of power supply means for connecting to loads;

a plurality of switch means for connecting each of said battery connection means to each of said power supply means;

external power supply input means for connecting an external DC power supply to each of said power supply portions;

a charging circuit connected between said external power supply input means and each of said battery connection means;

discharging current measurement means for measuring a discharging current through each of said battery connection means;

charging current measurement means for measuring a charging current through each of said battery connection means;

load current measurement means for measuring a load current for each of said power supply means as a load state of said power supply means; and control means for calculating a remaining capacity of batteries connected to said battery connection means from the discharging current measured by said discharging current measurement means and the charging current measured by said charging current measurement means, and for controlling opening and closing operations of each of said switch means in accordance with the calculated remaining capacity and each of the load states.

27. A power supply means comprising:

a plurality of batteries;

a plurality of power supply means for connecting to loads;

a plurality of switch means for connecting each of said batteries to each of said power supply means;

remaining battery capacity measure means based upon consumed power of the respective batteries measuring discharging currents of a plurality of said batteries; and control means for controlling opening and closing operations of the plurality of said switch means in accordance with a remaining capacity of each of said batteries and with a load state by measuring a remaining capacity of each of said batteries, and by measuring a load power for each of said power supply means.

28. An electronic appliance equipped with a power supply apparatus, said power supply apparatus comprising:

a plurality of batteries;

a plurality of power supply means for connecting to loads;

a plurality of switch means for connecting each of said batteries to each of said power supply means;

remaining battery capacity measure means based upon consumed power of the respective batteries measuring discharging currents of a plurality of said batteries; and control means for controlling opening and closing operations of plurality of switch means in accordance with a residual quantity of each of said batteries and with a load state by measuring a residual quantity of each of said batteries, and measuring a load power for each of said power supply means.

29. A power supply apparatus, comprising:

a plurality of batteries;

a plurality of power supply means for connecting to loads;

a plurality of switch circuits for connecting each of the batteries to each of the power supply circuits;

remaining battery capacity measure means based upon consumed power of the respective batteries measuring a discharging current of each of said batteries; and a controller for controlling opening and closing operations of each of said switch circuits in accordance with a remaining capacity of each of said batteries measured by said remaining battery capacity measure means.

30. An electric appliance equipped with a power supply apparatus, said power supply apparatus further comprising:

a plurality of batteries;

a plurality of power supply circuits for connecting to a plurality of loads;

a plurality of switch circuits for connecting each of the batteries to each of the power supply circuits;

remaining battery capacity measure means based upon consumed power of the respective batteries measuring a discharging current of each of said batteries; and a controller for controlling opening and closing operations of each of said switch circuits in accordance with a remaining capacity of each of said batteries measured by said remaining battery capacity measure means.

31. A power supply apparatus, comprising:

a plurality of battery connection means;

a plurality of power supply means for connecting to loads;

a plurality of switch means for connecting each of said plurality of battery connection means to each of said power supply means;

remaining battery capacity measure means based upon consumed power of the respective batteries measuring discharging currents through the battery connection means; and control means for controlling opening and closing operations of the plurality of said switch means in accordance with a remaining capacity of batteries connected to each of said battery connection means and with a load state by measuring the remaining capacity of the batteries, and by measuring a load power for each of said power supply means.

32. A power supply apparatus, comprising:

a plurality of connection means for connecting to a corresponding plurality of batteries;

a plurality of power supply means for connecting to loads;

a plurality of switch means for connecting each of said battery connection means to each of said power supply means;

external power supply input means for connecting an external DC power supply to each of said plurality of power supply means;

a charging circuit connected between said external power supply input means and each of said plurality of battery connection means;

remaining battery capacity measure means based upon consumed power of the respective batteries measuring a discharging current through each of said battery connection means;

charging current measuring means for measuring a charging current through each of said battery connection means;

load current measuring means for measuring a load current for each of said power supply means as a load state of said power supply means; and control means for calculating a remaining capacity of the batteries connected to each of the plurality of battery connection means from the discharging current measured by said remaining battery capacity measure means and the charging current measured by said charging current measuring means, and for controlling opening and closing operations of said switch means in accordance with the remaining capacity of the batteries in each of said load states.

33. An electronic appliance equipped with a power supply apparatus, said power supply apparatus comprising:

a plurality of battery connection means;

a plurality of power supply means for connecting to loads;

a plurality of switch means for connecting each of said plurality of battery connection means to each of said power supply means;

remaining battery capacity measure means based upon consumed power of the respective batteries for measuring discharging currents through said plurality of battery connection means; and control means for controlling opening and closing operations of the plurality of switch means in accordance with a residual quantity of batteries connected to said battery connection means and with a load state by measuring a residual quantity of each of the batteries.

34. An electronic appliance equipped with a power supply apparatus, said power supply apparatus comprising:

a plurality of battery connection means;

a plurality of power supply means for connecting to loads;

a plurality of switch means for connecting each of said battery connection means to each of said power supply means;

external power supply input means for connecting an external DC power supply to each of said power supply portions;

a charging circuit connected between said external power supply input means and each of said battery connection means;

remaining battery capacity measure means based upon consumed power of the respective batteries for measuring a discharging current through each of said battery connection means;

charging current measurement means for measuring a charging current through each of said battery connection means;

load current measurement means for measuring a load current for each of said power supply means as a load state of said power supply means; and control means for calculating a remaining capacity of batteries connected to said battery connection means from the discharging current measured by said remaining battery capacity measure means and the charging current measured by said charging current measurement means, and for controlling opening and closing operations of each of said switch means in accordance with the calculated remaining capacity and each of the load states.

* * * * *